(12) United States Patent
Emori et al.

(10) Patent No.: US 10,556,997 B2
(45) Date of Patent: Feb. 11, 2020

(54) CROSS-LINKED RUBBER PRODUCT

(71) Applicant: ZEON CORPORATION, Tokyo (JP)

(72) Inventors: Nobuyoshi Emori, Tokyo (JP);
Tomonori Ogawa, Tokyo (JP);
Takanori Arakawa, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 3 days.

(21) Appl. No.: 15/549,921

(22) PCT Filed: Feb. 23, 2016

(86) PCT No.: PCT/JP2016/055143
§ 371 (c)(1),
(2) Date: Aug. 9, 2017

(87) PCT Pub. No.: WO2016/136697
PCT Pub. Date: Sep. 1, 2016

(65) Prior Publication Data
US 2018/0030216 A1    Feb. 1, 2018

(30) Foreign Application Priority Data

Feb. 25, 2015  (JP) ................................. 2015-034887

(51) Int. Cl.
*C08J 3/24* (2006.01)
*C08F 220/12* (2006.01)
*C08L 33/10* (2006.01)

(52) U.S. Cl.
CPC ............... *C08J 3/24* (2013.01); *C08F 220/12* (2013.01); *C08J 2333/08* (2013.01); *C08L 33/10* (2013.01)

(58) Field of Classification Search
CPC ........ C08J 3/24; C08J 2333/08; C08F 220/12; C08L 33/10
See application file for complete search history.

(56) References Cited

U.S. PATENT DOCUMENTS 4,904,736 A * 2/1990 Shimizu ................ C08F 220/18
525/279
6,156,849 A    12/2000 Moriyama et al.

FOREIGN PATENT DOCUMENTS

| JP | S63-041561 A | 2/1988 |
| JP | H06-99515 A | 4/1994 |
| JP | H07-010933 A | 1/1995 |
| JP | H11-92614 A | 4/1999 |
| JP | 2000-44757 A | 2/2000 |
| JP | 2011-006509 | * 1/2011 |
| JP | 2011-006509 A | 1/2011 |

OTHER PUBLICATIONS

Apr. 12, 2016 Search Report issued in International Patent Application No. PCT/JP2016/055143.
Sep. 12, 2018 extended European Search Report issued in European Application No. 16755443.5.

* cited by examiner

*Primary Examiner* — Roberto Rabago
(74) *Attorney, Agent, or Firm* — Oliff PLC

(57) ABSTRACT

A cross-linked rubber product is obtained by cross-linking an acrylic elastomer composition containing an acrylic elastomer obtained by copolymerization of an acrylate and a cross-linking site monomer. The molar fraction of an oxygen atom (a) in the acrylic elastomer is 11.3 mol % or less, the molar fraction of a nitrogen atom (b) in the acrylic elastomer is 0.5 mol % or less, and a volume change is from −3 to 6% when the cross-linked rubber product is dipped in distilled water at 80° C. for 200 hours.

3 Claims, No Drawings

CROSS-LINKED RUBBER PRODUCT

TECHNICAL FIELD

The present invention relates to a cross-linked rubber product having water resistance and further having resistance to a deteriorated engine oil.

BACKGROUND ART

A cross-linked acrylic rubber product is known as a rubber material having cold resistance according to a use environment and having excellent oil resistance, particularly excellent oil resistance at a high temperature. Therefore, demand for the cross-linked acrylic rubber product is increasing as a hose for automobiles, an oil seal for automobiles, an O-ring for automobiles, a conveyor belt incorporated in a device or a machine, or the like.

For example, Patent Literatures 1, 2, and 3 disclose an acrylic elastomer obtained by copolymerization of an acrylate, a cross-linking site monomer, and the like, and a cross-linked acrylic rubber product obtained by cross-linking the acrylic elastomer.

CITATION LIST

Patent Literature

Patent Literature 1: JP 6-99515 A
Patent Literature 2: JP 11-92614 A
Patent Literature 3: JP 2000-44757 A

SUMMARY OF INVENTION

Technical Problem

In recent years, an influence on a rubber part has been concerned, for example, because thermal environmental conditions around an internal combustion engine have become severe due to high output of the internal combustion engine, countermeasures for exhaust gas, and the like, and an engine oil is used at a high temperature without being exchanged for a long time to promote deterioration thereof due to contact with heat, air, water, exhaust gas, or the like.

Therefore, when the rubber part is an automobile seal member in contact with an engine oil or the like (an O-ring, a gasket, or the like), the rubber part needs to have resistance to a deteriorated engine oil (hereinafter, referred to as "a deteriorated engine oil"). Furthermore, the rubber part needs to have water resistance because deterioration progresses and hardening occurs by hydrolysis due to contact with water contained in the engine oil and an influence of heat or the like.

An object of the present invention is to provide a cross-linked acrylic rubber product having water resistance and further having resistance to a deteriorated engine oil (hereinafter, also simply referred to as "a cross-linked rubber product").

The present inventors have made intensive studies. As a result, the present inventors have found that the above object is achieved when a cross-linked rubber product obtained using an acrylic elastomer obtained by copolymerization of an acrylate and a cross-linking site monomer, containing an oxygen atom at a specific ratio or less and a nitrogen atom at a specific ratio or less, exhibits specific water resistance, and have completed the present invention.

Solution to Problem

Therefore, the present invention provides:

(1) a cross-linked rubber product obtained by cross-linking an acrylic elastomer composition containing an acrylic elastomer obtained by copolymerization of an acrylate and a cross-linking site monomer, in which a molar fraction of an oxygen atom (a) in the acrylic elastomer is 11.3 mol % or less, a molar fraction of a nitrogen atom (b) in the acrylic elastomer is 0.5 mol % or less, and a volume change is from −3 to 6% when the cross-linked rubber product is dipped in distilled water at 80° C. for 200 hours;

(2) the cross-linked rubber product described in (1), in which the acrylate is at least one selected from a group consisting of methyl acrylate, ethyl acrylate, n-butyl acrylate, and 2-methoxyethyl acrylate;

(3) the cross-linked rubber product described in (1) or (2), in which the acrylic elastomer contains 30 to 99.9% by weight of an acrylate unit;

(4) the cross-linked rubber product described in any one of (1) to (3), in which the cross-linking site monomer contains at least one group selected from a group consisting of a carboxyl group, an active chlorine group, and an epoxy group; and (5) the cross-linked rubber product described in any one of (1) to (4), in which the acrylic elastomer contains 0.1 to 10% by weight of a cross-linking site monomer unit.

Advantageous Effects of Invention

The cross-linked rubber product of the present invention can provide a cross-linked rubber product having water resistance and further having resistance to a deteriorated engine oil.

DESCRIPTION OF EMBODIMENTS

Hereinafter, a cross-linked rubber product of the present invention will be described. The cross-linked rubber product of the present invention is obtained by cross-linking an acrylic elastomer composition containing an acrylic elastomer obtained by copolymerization of an acrylate and a cross-linking site monomer, in which the molar fraction of an oxygen atom (a) in the acrylic elastomer is 11.3 mol % or less, the molar fraction of a nitrogen atom (b) in the acrylic elastomer is 0.5 mol % or less, and a volume change is from −3 to 6% when the cross-linked rubber product is dipped in distilled water at 80° C. for 200 hours.

(Acrylic Elastomer)

The acrylic elastomer used in the present invention is obtained by copolymerization of an acrylate and a cross-linking site monomer.

(Acrylate)

Examples of the acrylate include an alkyl acrylate and an alkoxyalkyl acrylate.

For example, the alkyl acrylate is an alkyl acrylate having an alkyl group of 1 to 8 carbon atoms, and is preferably an alkyl acrylate having an alkyl group of 1 to 4 carbon atoms from a viewpoint of improving oil resistance.

Specific examples of the alkyl acrylate having an alkyl group of 1 to 8 carbon atoms include methyl acrylate, ethyl acrylate, n-propyl acrylate, isopropyl acrylate, n-butyl acrylate, isobutyl acrylate, n-hexyl acrylate, 2-ethylhexyl acrylate, cyclohexyl acrylate, and octyl acrylate. Among these acrylates, methyl acrylate, ethyl acrylate, and n-butyl acrylate are preferable from a viewpoint of an excellent balance among heat resistance, oil resistance, and cold resistance. These alkyl acrylates may be used singly, or in combination of two or more kinds thereof.

The alkoxyalkyl acrylate is not particularly limited, but examples thereof include an alkoxyalkyl acrylate having an alkoxy group of 1 to 4 carbon atoms and an alkylene group of 1 to 4 carbon atoms from a viewpoint of improving oil resistance. Specific examples of the alkoxyalkyl acrylate having an alkoxy group of 1 to 4 carbon atoms and an alkylene group of 1 to 4 carbon atoms include 2-methoxyethyl acrylate, 2-ethoxyethyl acrylate, 2-butoxyethyl acrylate, and 2-methoxypropyl acrylate. Among these acrylates, 2-methoxyethyl acrylate and 2-butoxyethyl acrylate are preferable from a viewpoint of an excellent balance among heat resistance, oil resistance, and cold resistance. These alkoxyalkyl acrylates may be used singly, or in combination of two or more kinds thereof.

The content of an acrylate unit in a monomer unit constituting the acrylic elastomer used in the present invention is preferably from 30 to 99.9% by weight, more preferably from 40 to 99.5% by weight, still more preferably from 50 to 99% by weight, and particularly preferably from 55 to 99% by weight from a viewpoint of obtaining excellent rubber elasticity of an obtained cross-linked rubber product and a sufficient cross-linking density.

(Cross-linking Site Monomer)

As the cross-linking site monomer, a monomer copolymerizable with the above methyl acrylate, ethyl acrylate, n-butyl acrylate, and 2-methoxyethyl acrylate and capable of introducing a cross-linking site when a cross-linked rubber product is formed can be used without any particular limitation. However, examples of the cross-linking site monomer include a cross-linking site monomer having a carboxyl group, a cross-linking site monomer having an active chlorine group, and a cross-linking site monomer having an epoxy group.

Examples of the cross-linking site monomer having a carboxyl group include a carboxyl group-containing $\alpha,\beta$-ethylenically unsaturated monomer. Examples of the carboxyl group-containing $\alpha,\beta$-ethylenically unsaturated monomer include an $\alpha,\beta$-ethylenically unsaturated monocarboxylic acid, an $\alpha,\beta$-ethylenically unsaturated polyvalent carboxylic acid, an $\alpha,\beta$-ethylenically unsaturated polyvalent carboxylic acid anhydride, and an $\alpha,\beta$-ethylenically unsaturated polyvalent carboxylic acid partial ester.

Examples of the $\alpha,\beta$-ethylenically unsaturated monocarboxylic acid include acrylic acid, methacrylic acid, ethyl acrylic acid, and crotonic acid.

Examples of the $\alpha,\beta$-ethylenically unsaturated polyvalent carboxylic acid include fumaric acid, maleic acid, itaconic acid, and citraconic acid.

Examples of the $\alpha,\beta$-ethylenically unsaturated polyvalent carboxylic acid anhydride include maleic anhydride and itaconic anhydride.

Examples of the $\alpha,\beta$-ethylenically unsaturated polyvalent carboxylic acid partial ester include a butenedionic acid monoester such as monomethyl fumarate, mono-n-butyl fumarate, monoethyl maleate, mono-n-butyl maleate, mono-cyclopentyl fumarate, mono-cyclohexyl fumarate, or mono-cyclohexenyl maleate; and an itaconic acid monoester such as monoethyl itaconate or mono-n-butyl itaconate.

These compounds may be used singly or in combination of two or more kinds thereof. Among these compounds, as the cross-linking site monomer having a carboxyl group, an $\alpha,\beta$-ethylenically unsaturated monocarboxylic acid or an $\alpha,\beta$-ethylenically unsaturated polyvalent carboxylic acid partial ester is preferable. Among the $\alpha,\beta$-ethylenically unsaturated monocarboxylic acids, acrylic acid is particularly preferable. Among the $\alpha,\beta$-ethylenically unsaturated polyvalent carboxylic acid partial esters, a butenedionic acid monoester is more preferable, and mono-n-butyl maleate and mono-n-butyl fumarate are particularly preferable.

Examples of the cross-linking site monomer having an active chlorine group include 2-chloroethyl acrylate, 2-chloroethyl vinyl ether, vinyl chloroacetate, allyl chloroacetate, vinylbenzyl chloride, chloromethyl vinyl ketone, and 5-chloromethyl-2-norbornene. These compounds may be used singly or in combination of two or more kinds thereof. Among these monomers, as the cross-linking site monomer having an active chlorine group, vinyl chloroacetate is preferable.

Further, examples of the cross-linking site monomer having an epoxy group include glycidyl acrylate, glycidyl methacrylate, allyl glycidyl ether, and methallyl glycidyl ether. These compounds may be used singly or in combination of two or more kinds thereof.

The content of a cross-linking site monomer unit in a monomer unit constituting the acrylic elastomer used in the present invention is preferably from 0.1 to 10% by weight, more preferably from 0.5 to 9% by weight, and still more preferably from 1 to 8% by weight from a viewpoint of obtaining excellent rubber elasticity of an obtained cross-linked rubber product and a sufficient cross-linking density.

When the content of a cross-linking site monomer unit is within the above range, a phenomenon that an obtained cross-linked rubber product is harder and elongation thereof is reduced due to an excessively large content of the cross-linking site monomer unit can be suppressed, and a phenomenon that the strength of an obtained cross-linked rubber product is insufficient due to an excessively small content of the cross-linking site monomer unit can be suppressed.

The cross-linked rubber product of the present invention may include another monomer unit copolymerizable with the above monomers (also referred to as "other monomer unit") as long as an object of the present invention is not essentially impaired.

Examples of such a copolymerizable other monomer include an alkyl methacrylate monomer such as methyl methacrylate or n-butyl methacrylate; an aromatic vinyl monomer such as styrene, $\alpha$-methyl styrene, vinyl benzyl chloride, or divinylbenzene; an $\alpha,\beta$-ethylenically unsaturated nitrile monomer such as acrylonitrile or methacrylonitrile; a monomer having two or more (meth)acryloyloxy groups (polyfunctional acryl monomer), such as a (meth) acrylic acid diester of ethylene glycol or a (meth)acrylic acid diester of propylene glycol; 3,4-epoxy-1-butene, 1.2-epoxy-3-pentene, 1,2-epoxy-5,9-cyclododecadiene, 2-hydroxyethyl (meth)acrylate, 2-hydroxypropyl (meth)acrylate, 3-hydroxypropyl (meth)acrylate, (meth)acrylamide, N-hydroxy (meth)acrylamide, ethylene, propylene, vinyl acetate, ethyl vinyl ether, and butyl vinyl ether. These monomers may be used singly or in combination of two or more kinds thereof. Note that here, "(meth)acrylic" means "acrylic" and "methacrylic".

The content of other monomer units in the acrylic elastomer used in the present invention is preferably 69.5% by weight or less, more preferably 59.5% by weight or less, still more preferably 49% by weight or less, and particularly preferably 44% by weight or less.

The acrylic elastomer used in the present invention can be manufactured by polymerizing a monomer mixture including an acrylate, a cross-linking site monomer, and other monomers as necessary by using a known method such as emulsion polymerization, suspension polymerization, solution polymerization, or bulk polymerization.

The total amount of all the kinds of the above monomers is not necessarily required to be supplied to a reaction site at the beginning of the reaction, but may be added continuously or intermittently throughout the reaction time considering a copolymerization reactivity ratio, a reaction conversion, or the like, or may be introduced at once or dividedly in the middle of the reaction or in the second half thereof.

A ratio among the initial amounts of the above monomers in a polymerization reaction is adjusted according to a monomer unit composition of an intended acrylic elastomer and reactivities of the monomers.

The molar fraction of an oxygen atom (a) in the acrylic elastomer used in the present invention is 11.3 mol % or less, and preferably 11.2 mol % or less. The lower limit thereof is not particularly limited, but is preferably 1 mol % or more, more preferably 3 mol % or more, and still more preferably 5 mol % or more from a viewpoint of oil resistance of an obtained cross-linked rubber product. The molar fraction of a nitrogen atom (b) is 0.5 mol % or less, and preferably 0.3 mol % or less. When the molar fraction of an oxygen atom is too large, resistance to a deteriorated engine oil may be poor. When the molar fraction of a nitrogen atom is too large, resistance to a deteriorated engine oil may be also poor.

Here, the molar fractions of an oxygen atom and a nitrogen atom can be represented by the following calculation formulae when the substance amount of all the components constituting the acrylic elastomer at an atomic level is $n_A$, and the substance amounts of an oxygen atom and a nitrogen atom are $n_O$ and $n_N$, respectively.

$$\text{Molar fraction of oxygen atom (mol \%)} = (n_O/n_A) \times 100$$

$$\text{Molar fraction of nitrogen atom (mol \%)} = (n_N/n_A) \times 100$$

Incidentally, the substance amount of each of components constituting the acrylic elastomer at an atomic level can be obtained by determining a molar content ratio of each of monomer units constituting the acrylic elastomer, then multiplying the number of atom components contained in each of the monomer units (for example, a methyl acrylate unit contains four carbon atoms, six hydrogen atoms, two oxygen atoms, and zero nitrogen atom) by a content ratio (molar ratio) of each of the monomer units, and adding the content ratios of all the monomer units for each atom component. That is, the substance amount of an oxygen atom $n_O$ and the substance amount of a nitrogen atom $n_N$ can be thereby determined. The substance amount of all the components $n_A$ can be determined by adding all the substance amounts of the components determined for each atom component.

The Mooney viscosity ($ML_{1+4}$, 100° C.) of the acrylic rubber used in the present invention is preferably from 10 to 90, more preferably from 15 to 80, and particularly preferably from 20 to 70. When the Mooney viscosity is within the above range, a phenomenon that molding processability is deteriorated by reduction in a shape retention property of an acrylic elastomer composition or the tensile strength of a cross-linked rubber product is reduced due to an excessively low Mooney viscosity can be suppressed, and a phenomenon that molding processability is deteriorated by reduction in flowability of an acrylic elastomer composition due to an excessively high Mooney viscosity can be suppressed.

(Acrylic Elastomer Composition)

The cross-linked rubber product of the present invention is obtained by cross-linking an acrylic elastomer composition containing the above acrylic elastomer. In cross-linking, the above acrylic elastomer composition usually further contains a cross-linking agent.

(Cross-linking Agent)

As the cross-linking agent, a cross-linking agent to form a cross-linking structure by a reaction with a cross-linking site monomer unit acting as a cross-linking site in the acrylic elastomer can be used without any limitation.

When a cross-linking site monomer for introducing a cross-linking site monomer unit is a cross-linking site monomer having a carboxyl group, a cross-linking agent for a carboxyl group can be used. Examples of the cross-linking agent for a carboxyl group include a polyamine compound, a polyvalent hydrazide compound, a polyvalent epoxy compound, a polyvalent isocyanate compound, and an aziridine compound.

The polyamine compound preferably has 4 to 30 carbon atoms. Examples of such a polyamine compound include an aliphatic polyamine compound and an aromatic polyamine compound, but do not include a compound having a non-conjugated nitrogen-carbon double bond, such as a guanidine compound.

Examples of the aliphatic polyamine compound include an aliphatic diamine such as hexamethylene diamine, hexamethylenediamine carbamate, or N,N'-dicinnamylidene-1, 6-hexanediamine. These compounds may be used singly or in combination of two or more kinds thereof.

Examples of the aromatic polyamine compound include an aromatic diamine such as 4,4'-methylene dianiline, m-phenylenediamine, 4,4'-diaminodiphenyl ether, 3,4'-diaminodiphenyl ether, 4,4'-(m-phenylene diisopropylidene) dianiline, 4,4'-(p-phenylene diisopropylidene) dianiline, 2,2'-bis[4-(4-aminophenoxy) phenyl] propane, 4,4'-diamino benzanilide, 4,4'-bis(4-aminophenoxy) biphenyl, m-xylylenediamine, or p-xylylenediamine; and 1,3,5-benzenetriamine. These compounds may be used singly or in combination of two or more kinds thereof.

Examples of the polyvalent hydrazide compound include oxalic acid dihydrazide, malonic acid dihydrazide, succinic acid dihydrazide, glutaric acid dihydrazide, adipic acid dihydrazide, pimelic acid dihydrazide, suberic acid dihydrazide, azelaic acid dihydrazide, sebacic acid dihydrazide, dodecanedioic acid dihydrazide, phthalic acid dihydrazide, isophthalic acid dihydrazide, terephthalic acid dihydrazide, 2,6-naphthalene dicarboxylic acid dihydrazide, naphthalic acid dihydrazide, acetone dicarboxylic acid dihydrazide, fumaric acid dihydrazide, maleic acid dihydrazide, itaconic acid dihydrazide, trimellitic acid dihydrazide, 1,3,5-benzenetricarboxylic acid dihydrazide, pyromellitic acid dihydrazide, and aconitic acid dihydrazide. These compounds may be used singly or in combination of two or more kinds thereof.

Examples of the polyvalent epoxy compound include a compound having two or more epoxy groups in a molecule thereof, such as a glycidyl ether epoxy compound including a phenol novolak epoxy compound, a cresol novolak epoxy compound, a cresol epoxy compound, a bisphenol A epoxy compound, a bisphenol F epoxy compound, a brominated bisphenol A epoxy compound, a brominated bisphenol F epoxy compound, and a hydrogenated bisphenol A epoxy compound; or another polyvalent epoxy compound including an alicyclic epoxy compound, a glycidyl ester epoxy compound, a glycidyl amine epoxy compound, and an isocyanurate epoxy compound. These compounds may be used singly or in combination of two or more kinds thereof.

As the polyvalent isocyanate compound, a diisocyanate compound and a triisocyanate compound having 6 to 24 carbon atoms are preferable. Specific examples of the diisocyanate compound include 2,4-tolylene diisocyanate (2,4-TDI), 2,6-tolylene diisocyanate (2,6-TDI), 4,4'-diphenylmethane diisocyanate (MDI), hexamethylene diisocyanate, p-phenylene diisocyanate, m-phenylene diisocyanate, and 1,5-naphthylene diisocyanate. Specific examples of the triisocyanate compound include 1,3,6-hexamethylene triisocyanate, 1,6,11-undecane triisocyanate, and bicycloheptane triisocyanate. These compounds can be used singly or in combination of two or more kinds thereof.

Examples of the aziridine compound include tris-2,4,6 (1-aziridinyl)-1,3,5-triazine, tris[1-(2-methyl) aziridinyl] phosphine oxide, and hexa[1-(2-methyl) aziridinyl]triphosphatriazine. These compounds can be used singly or in combination of two or more kinds thereof.

Among the cross-linking agents for a carboxyl group, a polyamine compound and a polyvalent hydrazide compound can be preferably used, the polyamine compound can be more preferably used, and an aliphatic diamine and an aromatic diamine can be particularly preferably used. Among the aliphatic diamines, hexamethylenediamine carbamate is preferable. Among the aromatic diamines, 2,2'-bis[4-(4-aminophenoxy) phenyl] propane is preferable.

When the cross-linking site monomer for introducing a cross-linking site monomer unit is a cross-linking site monomer having an active chlorine group, a cross-linking agent for an active chlorine group can be used. Examples of the cross-linking agent for an active chlorine group include a triazine thiol derivative such as trithiocyanuric acid or 2,4,6-trimercapto-s-triazine; an organic carboxylic acid ammonium salt such as ammonium benzoate or ammonium adipate; and a metal soap and sulfur. Among the cross-linking agents for an active chlorine group, a triazine thiol derivative can be preferably used, and 2,4,6-trimercapto-s-triazine can be more preferably used.

When the cross-linking site monomer for introducing a cross-linking site monomer unit is a cross-linking site monomer having an epoxy group, a cross-linking agent for an epoxy group can be used. Examples of the cross-linking agent for an epoxy group include ammonium benzoate, a dithiocarbamate, a polyamine and a derivative thereof, an imidazole, polycarboxylic acid and a quaternary ammonium salt, or polycarboxylic acid and a quaternary phosphonium salt.

The content of a cross-linking agent in the acrylic elastomer composition used in the present invention is preferably from 0.05 to 20 parts by weight, more preferably from 0.1 to 10 parts by weight, and particularly preferably from 0.2 to 7 parts by weight with respect to 100 parts by weight of the acrylic elastomer. When the content of a cross-linking agent is within the above range, a phenomenon that cross-linking is insufficient due to an excessively small content of the cross-linking agent and it is difficult to retain the shape of a cross-linked rubber product can be suppressed, and a phenomenon that a cross-linked rubber product is too hard due to an excessively large content of the cross-linking agent and the elasticity thereof is impaired can be suppressed.

(Cross-linking Accelerator)

The acrylic elastomer composition used in the present invention preferably further contains a cross-linking accelerator.

The cross-linking accelerator is not particularly limited. However, when the cross-linking site monomer for introducing a cross-linking site monomer unit is a cross-linking site monomer having a carboxyl group and the cross-linking agent is a polyamine compound, preferable examples of the cross-linking accelerator include an aliphatic monovalent secondary amine compound, an aliphatic monovalent tertiary amine compound, a guanidine compound, an imidazole compound, a quaternary onium salt, a tertiary phosphine compound, an alkali metal salt of a weak acid, and a diazabicycloalkene compound. These cross-linking accelerators can be used singly or in combination of two or more kinds thereof.

The aliphatic monovalent secondary amine compound is obtained by replacing two hydrogen atoms of ammonia with aliphatic hydrocarbon groups. The aliphatic hydrocarbon group to be replaced with a hydrogen atom preferably has 1 to 30 carbon atoms, and more preferably has 8 to 20 carbon atoms. Specific examples of the aliphatic monovalent secondary amine compound include dimethylamine, diethylamine, di-n-propylamine, diallylamine, diisopropylamine, di-n-butylamine, di-t-butylamine, di-sec-butylamine, dihexylamine, diheptylamine, dioctylamine, dinonylamine, didecylamine, diundecylamine, didodecylamine, ditridecylamine, ditetradecylamine, dipentadecylamine, dicetylamine, di-2-ethylhexylamine, dioctadecylamine, di-cis-9-octadecenylamine, and dinonadecylamine. Among these compounds, dioctylamine, didecylamine, didodecylamine, ditetradecylamine, dicetylamine, dioctadecylamine, di-cis-9-octadecenylamine, dinonadecylamine, and the like are preferable.

The aliphatic monovalent tertiary amine compound is obtained by replacing all the three hydrogen atoms of ammonia with aliphatic hydrocarbon groups. The aliphatic hydrocarbon group to be replaced with a hydrogen atom preferably has 1 to 30 carbon atoms, and more preferably has 1 to 22 carbon atoms. Specific examples of the aliphatic monovalent tertiary amine compound include trimethylamine, triethylamine, tri-n-propylamine, triallylamine, triisopropylamine, tri-n-butylamine, tri-t-butylamine, tri-sec-butylamine, trihexylamine, triheptylamine, trioctylamine, trinonylamine, tridecylamine, triundecylamine, tridodecylamine, tritridecylamine, tritetradecylamine, tripentadecylamine, tricetylamine, tri-2-ethylhexylamine, trioctadecylamine, tri-cis-9-octadecenylamine, trinonadecylamine, N,N-dimethyldecylamine, N,N-dimethyldodecylamine, N,N-dimethyltetradecylamine, N,N-dimethylcetylamine, N,N-dimethyloctadecylamine, N,N-dimethylbehenylamine, N-methyldidecylamine, N-methyldidodecylamine, N-methylditetradecylamine, N-methyldicetylamine, N-methyldioctadecylamine, N-methyldibehenylamine, and dimethylcyclohexylamine. Among these compounds, N,N-dimethyldodecylamine, N,N-dimethyltetradecylamine, N,N-dimethylcetylamine, N,N-dimethyloctadecylamine, N,N-dimethylbehenylamine, and the like are preferable.

Specific examples of the guanidine compound include 1,3-di-o-tolyl guanidine and 1,3-diphenyl guanidine. 1,3-di-o-tolyl guanidine is preferable.

Specific examples of the imidazole compound include 2-methyl imidazole and 2-phenyl imidazole.

Specific examples of the quaternary onium salt include tetra-n-butylammonium bromide and octadecyl tri-n-butylammonium bromide.

Specific examples of the tertiary phosphine compound include triphenylphosphine and tri-p-tolyl phosphine.

Specific examples of the alkali metal salt of a weak acid include an inorganic weak acid salt such as sodium phosphate, potassium phosphate, sodium carbonate, or potassium carbonate, and an organic weak acid salt such as sodium stearate, potassium stearate, sodium laurate, or potassium laurate.

Specific examples of the diazabicycloalkene compound include 1,8-diazabicyclo [5.4.0] undec-7-ene (DBU) and 1,5-diazabicyclo [4.3.0] non-5-ene (DBN).

When the cross-linking site monomer for introducing a cross-linking site monomer unit is a cross-linking site monomer having an active chlorine group and the cross-linking agent is sulfur, preferable examples of the cross-linking accelerator include a fatty acid metal soap.

When the cross-linking site monomer for introducing a cross-linking site monomer unit is a cross-linking site monomer having an active chlorine group and the cross-linking agent is a triazine thiol derivative, preferable examples of the cross-linking accelerator include a dithiocarbamate and a derivative thereof, a thiourea compound, and a thiuram sulfide compound. These cross-linking accelerators can be used singly or in combination of two or more kinds thereof.

Specific examples of the fatty acid metal soap include sodium stearate, potassium stearate, potassium oleate, sodium laurate, and sodium 2-ethylhexanoate.

Specific examples of the dithiocarbamate and a derivative thereof include a dithiocarbamic acid metal salt such as zinc dimethyldithiocarbamate, zinc diethyldithiocarbamate, zinc dibutyldithiocarbamate, zinc methylbenzyl dithiocarbamate, zinc dibenzyl dithiocarbamate, zinc methylcyclohexyl dithiocarbamate, zinc N-pentamethylene dithiocarbamate, copper dimethyldithiocarbamate, lead dimethyldithiocarbamate, cadmium dimethyldithiocarbamate, bismuth dimethyldithiocarbamate, ferric dimethyldithiocarbamate, tellurium dimethyldithiocarbamate, or selenium dimethyldithiocarbamate; and a complex salt of a dithiocarbamic acid metal salt and an amine such as dibutylamine or cyclohexylethylamine, and a double salt thereof. Among these compounds, a dithiocarbamate of zinc is preferable, and zinc dibutyldithiocarbamate is more preferable.

Specific examples of the thiourea compound include diphenyl thiourea, diethyl thiourea, dibutyl thiourea, di-o-tolyl thiourea, trimethyl thiourea, and ethylene thiourea. Among these compounds, diethyl thiourea is preferable.

Specific examples of the thiuram sulfide compound include tetramethylthiuram monosulfide, tetramethylthiuram disulfide, tetraethylthiuram disulfide, tetra-n-butylthiuram disulfide, and di-pentamethylenethiuram tetrasulfide.

When the cross-linking site monomer for introducing a cross-linking site monomer unit is a cross-linking site monomer having an epoxy group and the cross-linking agent is a dithiocarbamate, preferable examples of the cross-linking accelerator include a dithiocarbamate other than the dithiocarbamate used as the cross-linking agent. For example, when zinc dithiocarbamate is used as the cross-linking agent, ferric dithiocarbamate is preferable as the cross-linking accelerator. These cross-linking accelerators can be used singly or in combination of two or more kinds thereof.

The use amount of a cross-linking accelerator is preferably from 0.1 to 20 parts by weight, more preferably from 0.2 to 15 parts by weight, and particularly preferably from 0.3 to 10 parts by weight with respect to 100 parts by weight of the acrylic elastomer. When the use amount of a cross-linking accelerator is within the above range, a phenomenon that the cross-linking rate is too high during cross-linking, bloom of the cross-linking accelerator is generated on a surface of a cross-linked product, or the cross-linked product is too hard due to an excessively large use amount of the cross-linking accelerator can be suppressed, and a phenomenon that the tensile strength of a cross-linked product is significantly reduced due to an excessively small use amount of the cross-linking accelerator can be suppressed.

In addition, the acrylic elastomer composition used in the present invention may include an additive such as a processing aid, an anti-aging agent, a light stabilizer, a plasticizer, a reinforcing agent (for example, carbon black, silica, or calcium carbonate), a slip agent, a silane coupling agent, an adhesive, a lubricant, a flame retardant, an antifungal agent, an antistatic agent, a coloring agent, or a filler, as necessary.

To the acrylic elastomer composition used in the present invention, a polymer such as an elastomer other than the acrylic elastomer, or a resin may be added as necessary.

Examples of the elastomer include an olefin elastomer, a styrene elastomer, a polyester elastomer, a polyamide elastomer, a polyurethane elastomer, and a polysiloxane elastomer.

Examples of the resin include an olefin resin, a styrene resin, an acrylic resin, polyphenylene ether, polyester, polycarbonate, and polyamide.

As a method for preparing the acrylic elastomer composition used in the present invention, a mixing method such as roll mixing, Banbury mixing, screw mixing, or solution mixing can be employed appropriately. A blending order is not particularly limited. However, it is only required to sufficiently mix components not easily causing a reaction or decomposition by heat and then to mix components easily causing a reaction or decomposition by heat (for example, a cross-linking agent or a cross-linking accelerator) at a temperature not causing a reaction or decomposition in a short time.

(Cross-linked Rubber Product)

The cross-linked rubber product of the present invention is obtained by cross-linking the above acrylic elastomer composition.

Cross-linking is usually performed by heating the acrylic elastomer composition. As cross-linking conditions, a cross-linking temperature is preferably from 130 to 220° C., and more preferably from 140 to 200° C., and cross-linking time is preferably from 30 seconds to two hours, and more preferably from one minute to one hour. This cross-linking at a first step is also referred to as primary cross-linking.

Examples of a molding method for obtaining a cross-linked rubber product having a desired shape include a conventionally known molding method such as extrusion molding, injection molding, transfer molding, or compression molding. Of course, cross-linking can be performed by heating at the same time as molding.

General procedures for processing an elastomer can be employed for extrusion molding. That is, an elongated extrusion molded product having a desired cross sectional shape (a plate, a rod, a pipe, a hose, a deformed article, or the like) is obtained by supplying an elastomer composition prepared by roll mixing or the like to a feed port of an extruder, softening the elastomer composition by heating from a barrel in a process of sending the elastomer composition to a head portion with a screw, and causing the elastomer composition to pass through a die having a predetermined shape and disposed in the head.

In injection molding, transfer molding, and compression molding, shaping can be performed by filling a cavity of a mold having a shape of one product or several products with the acrylic elastomer composition. By heating this mold, shaping and cross-linking can be performed almost simultaneously.

In addition to the primary cross-linking, secondary cross-linking can be performed, as necessary, by heating this cross-linked rubber product in an oven or the like using electricity, hot air, steam, or the like as a heat source at 130 to 220° C., preferably at 140 to 200° C. for 1 to 48 hours.

In the cross-linked rubber product of the present invention, a volume change is from −3 to 6% when the cross-linked rubber product is dipped in distilled water at 80° C. for 200 hours. When the volume change is not within this range, resistance to a deteriorated engine oil may be poor. The above volume change can be adjusted by a composition of monomer units constituting the acrylic elastomer, a condition of manufacturing the acrylic elastomer, such as a polymerization, coagulation, or drying method, a cross-linking condition in manufacturing a cross-linked rubber product, and the like.

Note that a water resistance test for measuring a volume change of a cross-linked rubber product can be performed by a method described in Examples described below (method in conformity to JIS K6258), for example.

The cross-linked rubber product of the present invention has a basic characteristic as an acrylic rubber, such as tensile strength, elongation, or hardness. In addition, the cross-linked rubber product has water resistance, and further has excellent resistance to a deteriorated engine oil. Therefore, for example, the cross-linked rubber product of the present invention can be used suitably for an automobile seal member in contact with a fuel oil, an engine oil, or the like (an O-ring, a gasket, or the like).

EXAMPLES

Hereinafter, the present invention will be described more specifically by indicating Examples. Hereinafter, "part" and "%" are based on a weight unless otherwise particularly specified. However, the present invention is not limited only to these Examples. Tests of characteristics and evaluation thereof were performed as follows.

(1) Mooney Viscosity ($ML_{1+4}$, 100° C.)

The Mooney viscosity of an acrylic elastomer was measured at a measurement temperature of 100° C. in accordance with a Mooney viscosity test in JIS K6300 uncross-linked rubber physical testing methods.

(2) Original State Properties (Tensile Strength, Elongation, Hardness)

The resulting sheet-like cross-linked rubber product obtained in each of Examples and Comparative Examples was punched with a dumbbell-shaped No. 3 to manufacture a test piece. Subsequently, using this test piece, the tensile strength and elongation were measured in accordance with JIS K6251, and the hardness was measured in accordance with JIS K6253 using a durometer hardness tester (type A).

(3) Water Resistance Test

A water resistance test was performed in conformity to JIS K6258.

As for a test piece, in a similar manner to evaluation of the above-described original state properties, a sheet-like cross-linked rubber product was obtained, and the resulting sheet-like cross-linked rubber product was punched into a size of a length of 30 mm, a width of 20 mm, and a thickness of 2.0±0.2 mm to manufacture a test piece for a volume change.

The test piece for a volume change test was put in a glass tube having an inner volume of 250 cc, 200 cc of distilled water was put therein, and the test piece was disposed such that all parts of the test piece were dipped in the liquid. Subsequently, the glass tube was put in a heating tank, and was heated at 80° C. for 200 hours.

After being heated, the test piece for a volume change test was taken out, and distilled water was wiped off. Thereafter, a volume thereof was measured, and a volume change ΔV (%) with respect to an initial volume was calculated.

(4) Deteriorated Engine Oil Dipping Test

As for a test piece, in a similar manner to evaluation of the above-described original state properties, a sheet-like cross-linked rubber product was obtained, and the resulting sheet-like cross-linked rubber product was punched with a dumbbell-shaped No. 3 to manufacture a test piece for a tensile test.

The test piece for a tensile test was put in a glass separable flask having an inner volume of 1000 cc in a form of being hung on a PTFE hanger. Therein, 800 cc of a test liquid (deteriorated engine oil) was put, and the test piece was disposed such that all parts of the test pieces were dipped in the liquid. Subsequently, a PTFE-coated stirrer was put in the separable flask, and then a glass lid was fixed with a dedicated clip. Further, one of connection ports provided on the glass lid is connected to a reflux tube to cause cooling water to flow therein, and the remaining connection ports were all sealed with glass stoppers. In addition, the separable flask was disposed in a heating device with a magnetic stirrer (trade name "Chemist Plaza CP-300", manufactured by Shibata Kagaku Co., Ltd.), and was heated at 150° C. for 1000 hours while the test liquid was stirred with the magnetic stirrer.

The test liquid (deteriorated engine oil) was manufactured by mixing 10.5 g of sulfuric acid having a purity of 95%, 14.5 g of nitric acid having a purity of 69%, 1.0 g of acetic acid having a purity of 99.7%, and 1.0 g of formic acid having a purity of 98% with respect to 973 g of an engine oil (trade name "Mobill 0W-40SM/CF", manufactured by Exxon Mobil Corporation). Note that the acid concentrations of sulfuric acid, nitric acid, acetic acid, and formic acid in the test liquid were 10,000 ppm, 10,000 ppm, 1,000 ppm, and 1,000 ppm, respectively.

After heating, the glass lid was opened, and the test piece for a tensile test was taken out from the separable flask. Subsequently, the test liquid adhering to the test piece for a tensile test was wiped off well. Thereafter, the test piece for a tensile test was cooled at room temperature, and then was pulled up and down, was bent, or the like by hand to judge deteriorated engine oil resistance of a cross-linked rubber product.

Deteriorated engine oil resistance was judged according to the following criteria.

A: A cross-linked rubber product retains rubber elasticity, and never causes cracking on an end surface even when being pulled.

B: A cross-linked rubber product has no more rubber elasticity, and causes cracking (elongation cracking) on an end surface when being pulled.

C: A cross-linked rubber product is hardened like a resin, and is broken when a trial to bend the cross-linked rubber product at 180° is performed (bending cracking).

A cross-linked rubber product which retains rubber elasticity even after being dipped in the test liquid (deteriorated engine oil) and in which elongation cracking or bending cracking is not observed has better deteriorated engine oil resistance. That is, better deteriorated engine oil resistance is indicated in the order of the judgement criteria A, B, and C.

Manufacturing Example 1

In a polymerization reactor provided with a thermometer and a stirrer, 200 parts of water, 3 parts of sodium lauryl sulfate, 20 parts of ethyl acrylate, 78 parts of n-butyl acrylate, and 2 parts of mono-n-butyl maleate were put. Oxygen was sufficiently removed from the reactor by performing deaeration under reduced pressure and nitrogen substitution twice. Thereafter, 0.005 parts of cumene hydroperoxide and 0.002 parts of sodium formaldehyde sulfoxylate were added thereto. Emulsion polymerization was started under normal pressure at a temperature of 30° C., and the reaction was caused to occur until a polymerization conversion ratio reached 95%. The resulting emulsion polymerization liquid was added to a calcium chloride aqueous solution containing 1000 parts of water and 5 parts of calcium chloride, was coagulated, was washed with water, and was dried to obtain an acrylic elastomer (A1). The acrylic elastomer (A1) had a composition of 20% by weight of an ethyl acrylate unit, 78% by weight of a n-butyl acrylate unit, and 2% by weight of a mono-n-butyl maleate unit. The Mooney viscosity ($ML_{1+4}$, 100° C.) thereof was 35. The molar fraction of an oxygen atom and the molar fraction of a nitrogen atom in the acrylic elastomer (A1) calculated from the composition of the acrylic elastomer (A1) were 10.36 mol % and 0 mol %, respectively.

Manufacturing Example 2

In a polymerization reactor provided with a thermometer and a stirrer, 200 parts of water, 3 parts of sodium lauryl sulfate, 78 parts of n-butyl acrylate, 20 parts of 2-methoxyethyl acrylate, and 2 parts of mono-n-butyl maleate were put. Oxygen was sufficiently removed from the reactor by performing deaeration under reduced pressure and nitrogen substitution twice. Thereafter, 0.005 parts of cumene hydroperoxide and 0.002 parts of sodium formaldehyde sulfoxylate were added thereto. Emulsion polymerization was started under normal pressure at a temperature of 30° C., and the reaction was caused to occur until a polymerization conversion ratio reached 95%. The resulting emulsion polymerization liquid was added to a calcium chloride aqueous solution containing 1000 parts of water and 5 parts of calcium chloride, was coagulated, was washed with water, and was dried to obtain an acrylic elastomer (A2). The acrylic elastomer (A2) had a composition of 78% by weight of a n-butyl acrylate unit, 20% by weight of a 2-methoxyethyl acrylate unit, and 2% by weight of a mono-n-butyl maleate unit. The Mooney viscosity ($ML_{1+4}$, 100° C.) thereof was 35. The molar fraction of an oxygen atom and the molar fraction of a nitrogen atom in the acrylic elastomer (A2) calculated from the composition of the acrylic elastomer (A2) were 10.79 mol % and 0 mol %, respectively.

Manufacturing Example 3

In a polymerization reactor provided with a thermometer and a stirrer, 200 parts of water, 3 parts of sodium lauryl sulfate, 68 parts of n-butyl acrylate, 20 parts of 2-methoxyethyl acrylate, 10 parts of methyl methacrylate, and 2 parts of mono-n-butyl maleate were put. Oxygen was sufficiently removed from the reactor by performing deaeration under reduced pressure and nitrogen substitution twice. Thereafter, 0.005 parts of cumene hydroperoxide and 0.002 parts of sodium formaldehyde sulfoxylate were added thereto. Emulsion polymerization was started under normal pressure at a temperature of 30° C., and the reaction was caused to occur until a polymerization conversion ratio reached 95%. The resulting emulsion polymerization liquid was added to a calcium chloride aqueous solution containing 1000 parts of water and 5 parts of calcium chloride, was coagulated, was washed with water, and was dried to obtain an acrylic elastomer (A3). The acrylic elastomer (A3) had a composition of 68% by weight of a n-butyl acrylate unit, 20% by weight of a 2-methoxyethyl acrylate unit, 10% by weight of a methyl methacrylate unit, and 2% by weight of a mono-n-butyl maleate unit. The Mooney viscosity ($ML_{1+4}$, 100° C.) thereof was 35. The molar fraction of an oxygen atom and the molar fraction of a nitrogen atom in the acrylic elastomer (A3) calculated from the composition of the acrylic elastomer (A3) were 11.17 mol % and 0 mol %, respectively.

Manufacturing Example 4

In a polymerization reactor provided with a thermometer and a stirrer, 200 parts of water, 3 parts of sodium lauryl sulfate, 68 parts of n-butyl acrylate, 25 parts of 2-methoxyethyl acrylate, 5 parts of n-butyl methacrylate, and 2 parts of mono-n-butyl maleate were put. Oxygen was sufficiently removed from the reactor by performing deaeration under reduced pressure and nitrogen substitution twice. Thereafter, 0.005 parts of cumene hydroperoxide and 0.002 parts of sodium formaldehyde sulfoxylate were added thereto. Emulsion polymerization was started under normal pressure at a temperature of 30° C., and the reaction was caused to occur until a polymerization conversion ratio reached 95%. The resulting emulsion polymerization liquid was added to a calcium chloride aqueous solution containing 1000 parts of water and 5 parts of calcium chloride, was coagulated, was washed with water, and was dried to obtain an acrylic elastomer (A4). The acrylic elastomer (A4) had a composition of 68% by weight of a n-butyl acrylate unit, 25% by weight of a 2-methoxyethyl acrylate unit, 5% by weight of a n-butyl methacrylate unit, and 2% by weight of a mono-n-butyl maleate unit. The Mooney viscosity ($ML_{1+4}$, 100° C.) thereof was 35. The molar fraction of an oxygen atom and the molar fraction of a nitrogen atom in the acrylic elastomer (A4) calculated from the composition of the acrylic elastomer (A4) were 11.02 mol % and 0 mol %, respectively.

Manufacturing Example 5

In a polymerization reactor provided with a thermometer and a stirrer, 200 parts of water, 3 parts of sodium lauryl sulfate, 98 parts of n-butyl acrylate, and 2 parts of mono-n-butyl maleate were put. Oxygen was sufficiently removed from the reactor by performing deaeration under reduced pressure and nitrogen substitution twice. Thereafter, 0.005 parts of cumene hydroperoxide and 0.002 parts of sodium formaldehyde sulfoxylate were added thereto. Emulsion polymerization was started under normal pressure at a temperature of 30° C., and the reaction was caused to occur until a polymerization conversion ratio reached 95%. The resulting emulsion polymerization liquid was added to a calcium chloride aqueous solution containing 1000 parts of water and 5 parts of calcium chloride, was coagulated, was washed with water, and was dried to obtain an acrylic elastomer (A5). The acrylic elastomer (A5) had a composition of 98% by weight of a n-butyl acrylate unit and 2% by weight of a mono-n-butyl maleate unit. The Mooney viscosity ($ML_{1+4}$, 100° C.) thereof was 35. The molar fraction of an oxygen atom and the molar fraction of a nitrogen atom in the acrylic elastomer (A5) calculated from the composition of the acrylic elastomer (A5) were 9.65 mol % and 0 mol %, respectively.

Manufacturing Example 6

In a pressure-resistant polymerization reactor provided with a thermometer and a stirrer, 150 parts of methylene chloride, 55 parts of methyl acrylate, 7.5 parts of acrylic acid, 0.15 parts of 2,2'-azobis(2-methylpropionitrile), and 20 part of boron trifluoride were put. Oxygen was sufficiently removed from the reactor by performing deaeration under reduced pressure and nitrogen substitution twice. Thereafter, 75 parts of ethylene was pressed thereinto. Subsequently, the polymerization reactor was heated to 50° C. to cause a reaction for six hours. Then, gas was released. Thereafter, a product was taken out from the polymerization reactor, steam was caused to pass therethrough, a volatile containing methylene chloride and boron trifluoride was removed, and the separated polymer was dissolved in acetone. The resulting solution was filtered, and water was added to obtain a precipitate. The resulting precipitate was washed with water and was dried to obtain an acrylic elastomer (A6). The acrylic elastomer (A6) had a composition of 55% by weight of a methyl acrylate unit, 37.5% by weight of an ethylene unit, and 7.5% by weight of an acrylic acid unit. The Mooney viscosity ($ML_{1+4}$, 100° C.) thereof was 20. The molar fraction of an oxygen atom and the molar fraction of a nitrogen atom in the acrylic elastomer (A6) calculated from the composition of the acrylic elastomer (A6) were 8.94 mol % and 0 mol %, respectively.

Manufacturing Example 7

In a polymerization reactor provided with a thermometer and a stirrer, 150 parts of water, 6.25 parts of partially saponified polyvinyl alcohol, 0.2 parts of sodium acetate, 78 parts of n-butyl acrylate, 15 parts of vinyl acetate, and 2 parts of mono-n-butyl maleate were put. Oxygen was sufficiently removed from the reactor by performing deaeration under reduced pressure and nitrogen substitution twice. Thereafter, ethylene was pressed thereinto, and the pressure was adjusted to 80 kg/cm². A t-hydroperoxide aqueous solution was pressed thereinto from an inlet. Emulsion polymerization was started at a temperature of 55° C. to cause a reaction for six hours. The resulting emulsion polymerization liquid was added to a calcium chloride aqueous solution containing 1000 parts of water and 5 parts of calcium chloride, was coagulated, was washed with water, and was dried to obtain an acrylic elastomer (A7). The acrylic elastomer (A7) had a composition of 78% by weight of a n-butyl acrylate unit, 15% by weight of a vinyl acetate unit, 5% by weight of an ethylene unit, and 2% by weight of a mono-n-butyl maleate unit. The Mooney viscosity ($ML_{1+4}$, 100° C.) thereof was 35. The molar fraction of an oxygen atom and the molar fraction of a nitrogen atom in the acrylic elastomer (A7) calculated from the composition of the acrylic elastomer (A7) were 9.94 mol % and 0 mol %, respectively.

Manufacturing Example 8

In a polymerization reactor provided with a thermometer and a stirrer, 200 parts of water, 3 parts of sodium lauryl sulfate, 68 parts of n-butyl acrylate, 30 parts of 2-methoxyethyl acrylate, and 2 parts of mono-n-butyl maleate were put. Oxygen was sufficiently removed from the reactor by performing deaeration under reduced pressure and nitrogen substitution twice. Thereafter, 0.005 parts of cumene hydroperoxide and 0.002 parts of sodium formaldehyde sulfoxylate were added thereto. Emulsion polymerization was started under normal pressure at a temperature of 30° C., and the reaction was caused to occur until a polymerization conversion ratio reached 95%. The resulting emulsion polymerization liquid was added to a calcium chloride aqueous solution containing 1000 parts of water and 5 parts of calcium chloride, was coagulated, was washed with water, and was dried to obtain an acrylic elastomer (A8). The acrylic elastomer (A8) had a composition of 68% by weight of a n-butyl acrylate unit, 30% by weight of a 2-methoxyethyl acrylate unit, and 2% by weight of a mono-n-butyl maleate unit. The Mooney viscosity ($ML_{1+4}$, 100° C.) thereof was 35. The molar fraction of an oxygen atom and the molar fraction of a nitrogen atom in the acrylic elastomer (A8) calculated from the composition of the acrylic elastomer (A8) were 11.39 mol % and 0 mol %, respectively.

Manufacturing Example 9

In a polymerization reactor provided with a thermometer and a stirrer, 200 parts of water, 3 parts of sodium lauryl sulfate, 30 parts of methyl acrylate, 68 parts of n-butyl acrylate, and 2 parts of mono-n-butyl maleate were put. Oxygen was sufficiently removed from the reactor by performing deaeration under reduced pressure and nitrogen substitution twice. Thereafter, 0.005 parts of cumene hydroperoxide and 0.002 parts of sodium formaldehyde sulfoxylate were added thereto. Emulsion polymerization was started under normal pressure at a temperature of 30° C., and the reaction was caused to occur until a polymerization conversion ratio reached 95%. The resulting emulsion polymerization liquid was added to a calcium chloride aqueous solution containing 1000 parts of water and 5 parts of calcium chloride, was coagulated, was washed with water, and was dried to obtain an acrylic elastomer (A9). The acrylic elastomer (A9) had a composition of 30% by weight of a methyl acrylate unit, 68% by weight of a n-butyl acrylate unit, and 2% by weight of a mono-n-butyl maleate unit. The Mooney viscosity ($ML_{1+4}$, 100° C.) thereof was 40. The molar fraction of an oxygen atom and the molar fraction of a nitrogen atom in the acrylic elastomer (A9) calculated from the composition of the acrylic elastomer (A9) were 11.57 mol % and 0 mol, respectively.

Manufacturing Example 10

In a polymerization reactor provided with a thermometer and a stirrer, 200 parts of water, 3 parts of sodium lauryl sulfate, 50 parts of ethyl acrylate, 48 parts of n-butyl acrylate, and 2 parts of mono-n-butyl maleate were put. Oxygen was sufficiently removed from the reactor by performing deaeration under reduced pressure and nitrogen substitution twice. Thereafter, 0.005 parts of cumene hydroperoxide and 0.002 parts of sodium formaldehyde sulfoxylate were added thereto. Emulsion polymerization was started under normal pressure at a temperature of 30° C., and the reaction was caused to occur until a polymerization conversion ratio reached 95%. The resulting emulsion polymerization liquid was added to a calcium chloride aqueous solution containing 1000 parts of water and 5 parts of calcium chloride, was coagulated, was washed with water, and was dried to obtain an acrylic elastomer (A10). The acrylic elastomer (A10) had a composition of 50% by weight of an ethyl acrylate unit, 48% by weight of a n-butyl acrylate unit, and 2% by weight of a mono-n-butyl maleate unit. The Mooney viscosity ($ML_{1+4}$, 100° C.) thereof was 35. The molar fraction of an oxygen atom and the molar fraction of a nitrogen atom in the acrylic elastomer (A10) calculated from the composition of the acrylic elastomer (A10) were 11.48 mol % and 0 mol %, respectively.

Manufacturing Example 11

In a polymerization reactor provided with a thermometer and a stirrer, 200 parts of water, 3 parts of sodium lauryl sulfate, 48 parts of ethyl acrylate, 25 parts of n-butyl acrylate, 20 parts of 2-methoxyethyl acrylate, 5 parts of n-butyl methacrylate, and 2 parts of mono-n-butyl maleate were put. Oxygen was sufficiently removed from the reactor by performing deaeration under reduced pressure and nitrogen substitution twice. Thereafter, 0.005 parts of cumene hydroperoxide and 0.002 parts of sodium formaldehyde sulfoxylate were added thereto. Emulsion polymerization was started under normal pressure at a temperature of 30° C., and the reaction was caused to occur until a polymerization conversion ratio reached 95%. The resulting emulsion polymerization liquid was added to a calcium chloride aqueous solution containing 1000 parts of water and 5 parts of calcium chloride, was coagulated, was washed with water, and was dried to obtain an acrylic elastomer (A11). The acrylic elastomer (A11) had a composition of 48% by weight of an ethyl acrylate unit, 25% by weight of a n-butyl acrylate unit, 20% by weight of a 2-methoxyethyl acrylate unit, 5% by weight of a n-butyl methacrylate unit, and 2% by weight of a mono-n-butyl maleate unit. The Mooney viscosity ($ML_{1+4}$, 100° C.) thereof was 35. The molar fraction of an oxygen atom and the molar fraction of a nitrogen atom in the acrylic elastomer (A11) calculated from the composition of the acrylic elastomer (A11) were 12.57 mol % and 0 mol %, respectively.

Manufacturing Example 12

In a polymerization reactor provided with a thermometer and a stirrer, 200 parts of water, 3 parts of sodium lauryl sulfate, 98 parts of ethyl acrylate, and 2 parts of mono-n-butyl maleate were put. Oxygen was sufficiently removed from the reactor by performing deaeration under reduced pressure and nitrogen substitution twice. Thereafter, 0.005 parts of cumene hydroperoxide and 0.002 parts of sodium formaldehyde sulfoxylate were added thereto. Emulsion polymerization was started under normal pressure at a temperature of 30° C., and the reaction was caused to occur until a polymerization conversion ratio reached 95%. The resulting emulsion polymerization liquid was added to a calcium chloride aqueous solution containing 1000 parts of water and 5 parts of calcium chloride, was coagulated, was washed with water, and was dried to obtain an acrylic elastomer (A12). The acrylic elastomer (A12) had a composition of 98% by weight of an ethyl acrylate unit and 2% by weight of a mono-n-butyl maleate unit. The Mooney viscosity ($ML_{1+4}$, 100° C.) thereof was 40. The molar fraction of an oxygen atom and the molar fraction of a nitrogen atom in the acrylic elastomer (A12) calculated from the composition of the acrylic elastomer (A12) were 13.40 mol % and 0 mol %, respectively.

Manufacturing Example 13

In a polymerization reactor provided with a thermometer and a stirrer, 200 parts of water, 3 parts of sodium lauryl sulfate, 78 parts of n-butyl acrylate, 20 parts of 2-methoxyethyl acrylate, and 2 parts of mono-n-butyl maleate were put. Oxygen was sufficiently removed from the reactor by performing deaeration under reduced pressure and nitrogen substitution twice. Thereafter, 0.005 parts of cumene hydroperoxide and 0.002 parts of sodium formaldehyde sulfoxylate were added thereto. Emulsion polymerization was started under normal pressure at a temperature of 30° C., and the reaction was caused to occur until a polymerization conversion ratio reached 95%. The resulting emulsion polymerization liquid was added to a calcium chloride aqueous solution containing 1000 parts of water and 50 parts of calcium chloride, was coagulated, was washed with water, and was dried to obtain an acrylic elastomer (A13). The acrylic elastomer (A13) had a composition of 78% by weight of a n-butyl acrylate unit, 20% by weight of a 2-methoxyethyl acrylate unit, and 2% by weight of a mono-n-butyl maleate unit. The Mooney viscosity ($ML_{1+4}$, 100° C.) thereof was 35. The molar fraction of an oxygen atom and the molar fraction of a nitrogen atom in the acrylic elastomer (A13) calculated from the composition of the acrylic elastomer (A13) were 10.79 mol % and 0 mol %, respectively.

Manufacturing Example 14

In a polymerization reactor provided with a thermometer and a stirrer, 200 parts of water, 3 parts of sodium lauryl sulfate, 90.5 parts of n-butyl acrylate, 7.5 parts of acrylonitrile, and 2 parts of mono-n-butyl maleate were put. Oxygen was sufficiently removed from the reactor by performing deaeration under reduced pressure and nitrogen substitution twice. Thereafter, 0.005 parts of cumene hydroperoxide and 0.002 parts of sodium formaldehyde sulfoxylate were added thereto. Emulsion polymerization was started under normal pressure at a temperature of 30° C., and the reaction was caused to occur until a polymerization conversion ratio reached 95%. The resulting emulsion polymerization liquid was added to a calcium chloride aqueous solution containing 1000 parts of water and 5 parts of calcium chloride, was coagulated, was washed with water, and was dried to obtain an acrylic elastomer (A14). The acrylic elastomer (A14) had a composition of 90.5% by weight of a n-butyl acrylate unit, 7.5% by weight of an acrylonitrile unit, and 2% by weight of a mono-n-butyl maleate unit. The Mooney viscosity ($ML_{1+4}$, 100° C.) thereof was 35. The molar fraction of an oxygen atom and the molar fraction of a nitrogen atom in the acrylic elastomer (A14) calculated from the composition of the acrylic elastomer (A14) were 9.06 mol % and 0.88 mol %, respectively.

Manufacturing Example 15

In a polymerization reactor provided with a thermometer and a stirrer, 200 parts of water, 3 parts of sodium lauryl sulfate, 83 parts of n-butyl acrylate, 15 parts of acrylonitrile, and 2 parts of mono-n-butyl maleate were put. Oxygen was sufficiently removed from the reactor by performing deaeration under reduced pressure and nitrogen substitution twice. Thereafter, 0.005 parts of cumene hydroperoxide and 0.002 parts of sodium formaldehyde sulfoxylate were added thereto. Emulsion polymerization was started under normal pressure at a temperature of 30° C., and the reaction was caused to occur until a polymerization conversion ratio reached 95%. The resulting emulsion polymerization liquid was added to a calcium chloride aqueous solution containing 1000 parts of water and 5 parts of calcium chloride, was coagulated, was washed with water, and was dried to obtain an acrylic elastomer (A15). The acrylic elastomer (A15) had a composition of 83% by weight of an n-butyl acrylate unit, 15% by weight of an acrylonitrile unit, and 2% by weight of a mono-n-butyl maleate unit. The Mooney viscosity ($ML_{1+4}$, 100° C.) thereof was 35. The molar fraction of an oxygen atom and the molar fraction of a nitrogen atom in the acrylic elastomer (A15) calculated from the composition of the acrylic elastomer (A15) were 8.46 mol % and 1.78 mol %, respectively.

Manufacturing Example 16

In a polymerization reactor provided with a thermometer and a stirrer, 150 parts of water, 6.25 parts of partially saponified polyvinyl alcohol, 0.2 parts of sodium acetate, 78 parts of ethyl acrylate, 15 parts of vinyl acetate, and 2 parts of mono-n-butyl maleate were put. Oxygen was sufficiently removed from the reactor by performing deaeration under reduced pressure and nitrogen substitution twice. Thereafter, ethylene was pressed thereinto, and the pressure was adjusted to 80 kg/cm$^2$. A t-hydroperoxide aqueous solution was pressed thereinto from an inlet. Emulsion polymerization was started at a temperature of 55° C. to cause a reaction for six hours. The resulting emulsion polymerization liquid was added to a calcium chloride aqueous solution containing 1000 parts of water and 5 parts of calcium chloride, was coagulated, was washed with water, and was dried to obtain an acrylic elastomer (A16). The acrylic elastomer (A16) had a composition of 78% by weight of an ethyl acrylate unit, 15% by weight of a vinyl acetate unit, 5% by weight of an ethylene unit, and 2% by weight of a mono-n-butyl maleate unit. The Mooney viscosity (ML$_{1+4}$, 100° C.) thereof was 40. The molar fraction of an oxygen atom and the molar fraction of a nitrogen atom in the acrylic elastomer (A16) calculated from the composition of the acrylic elastomer (A16) were 12.91 mol % and 0 mol %, respectively.

Example 1

To 100 parts of the acrylic elastomer (A1), 60 parts of HAF carbon black (trade name "SEAST 3", manufactured by Tokai Carbon Co., filler), 1 part of stearic acid, 1 part of an ester wax (trade name "Greg G-8205", manufactured by Dainippon Ink and chemicals, Inc., slip agent), and 2 parts of 4,4'-di-(α,α-dimethylbenzyl) diphenylamine (trade name: "Nocrac CD", manufactured by Ouchi Shinko chemical industry Co., Ltd., anti-aging agent) were added, and were mixed using a Banbury mixer at 50° C. for five minutes. Subsequently, the resulting mixture was transferred to a roll at 50° C. By blending 0.5 parts of hexamethylenediamine carbamate (trade name: "Diak #1", manufactured by Dupont Elastomer Co., cross-linking agent) and 2 parts of 1,3-di-o-tolyl guanidine (trade name: "Nocceler DT", manufactured by Ouchi Shinko chemical industrial Co., Ltd., cross-linking accelerator) to the mixture and kneading the resulting mixture, an acrylic elastomer composition was obtained.

The resulting acrylic elastomer composition was put in a mold having a length of 15 cm, a width of 15 cm, and a depth of 0.2 cm, and was pressed at 170° C. for 20 minutes while being pressurized at a press pressure of 10 MPa to obtain a sheet-like cross-linked rubber product. Subsequently, the resulting sheet-like cross-linked rubber product was put in a gear oven, and was heated at 170° C. for four hours.

A test piece was obtained using the resulting cross-linked rubber product by the above method, and original state properties (tensile strength, elongation, and hardness), water resistance, and deteriorated engine oil resistance were evaluated. Table 1 indicates results thereof.

Example 2

A cross-linked rubber product was obtained by a similar method to Example 1 except for adding 10 parts of a polyether ester plasticizer (trade name "Adekacizer RS735", manufactured by ADEKA Co., Ltd) during kneading using a Banbury mixer. A test piece was obtained using the resulting cross-linked rubber product by the above method, and original state properties (tensile strength, elongation, and hardness), water resistance, and deteriorated engine oil resistance were evaluated. Table 1 indicates results thereof.

Example 3

A cross-linked rubber product was obtained by a similar method to Example 1 except for using the acrylic elastomer (A2) in place of the acrylic elastomer (A1). A test piece was obtained using the resulting cross-linked rubber product by the above method, and original state properties (tensile strength, elongation, and hardness), water resistance, and deteriorated engine oil resistance were evaluated. Table 1 indicates results thereof.

Example 4

A cross-linked rubber product was obtained by a similar method to Example 1 except for using the acrylic elastomer (A3) in place of the acrylic elastomer (A1). A test piece was obtained using the resulting cross-linked rubber product by the above method, and original state properties (tensile strength, elongation, and hardness), water resistance, and deteriorated engine oil resistance were evaluated. Table 1 indicates results thereof.

Example 5

A cross-linked rubber product was obtained by a similar method to Example 1 except for using the acrylic elastomer (A4) in place of the acrylic elastomer (A1). A test piece was obtained using the resulting cross-linked rubber product by the above method, and original state properties (tensile strength, elongation, and hardness), water resistance, and deteriorated engine oil resistance were evaluated. Table 1 indicates results thereof.

Example 6

A cross-linked rubber product was obtained by a similar method to Example 1 except for using the acrylic elastomer (A5) in place of the acrylic elastomer (A1). A test piece was obtained using the resulting cross-linked rubber product by the above method, and original state properties (tensile strength, elongation, and hardness), water resistance, and deteriorated engine oil resistance were evaluated. Table 1 indicates results thereof.

Example 7

A cross-linked rubber product was obtained by a similar method to Example 1 except for using the acrylic elastomer (A6) in place of the acrylic elastomer (A1), and changing the blending amounts of hexamethylenediamine carbamate (trade name: "Diak #1", manufactured by Dupont Elastomer Co., cross-linking agent) and 1,3-di-o-tolyl guanidine (trade name: "Nocceler DT", manufactured by Ouchi Shinko chemical industrial Co., Ltd., cross-linking accelerator) to 1.25 parts and 4 parts, respectively during kneading using a roll. Original state properties (tensile strength, elongation, and hardness), water resistance, and deteriorated engine oil resistance were evaluated using the resulting cross-linked rubber product by the above method. Table 1 indicates results thereof.

Example 8

A cross-linked rubber product was obtained by a similar method to Example 1 except for using the acrylic elastomer (A6) in place of the acrylic elastomer (A1), adding 15 parts of a polyether ester plasticizer (trade name "Adekacizer RS735", manufactured by ADEKA Co., Ltd) during kneading using a Banbury mixer, and changing the blending amounts of hexamethylenediamine carbamate (trade name: "Diak #1", manufactured by Dupont Elastomer Co., cross-linking agent) and 1,3-di-o-tolyl guanidine (trade name: "Nocceler DT", manufactured by Ouchi Shinko chemical industrial Co., Ltd., cross-linking accelerator) to 1.25 parts and 4 parts, respectively during kneading using a roll. Original state properties (tensile strength, elongation, and hardness), water resistance, and deteriorated engine oil resistance were evaluated using the resulting cross-linked rubber product by the above method. Table 1 indicates results thereof.

Example 9

A cross-linked rubber product was obtained by a similar method to Example 1 except for using the acrylic elastomer (A7) in place of the acrylic elastomer (A1). A test piece was obtained using the resulting cross-linked rubber product by the above method, and original state properties (tensile strength, elongation, and hardness), water resistance, and deteriorated engine oil resistance were evaluated. Table 1 indicates results thereof.

Comparative Example 1

A cross-linked rubber product was obtained by a similar method to Example 1 except for using the acrylic elastomer (A8) in place of the acrylic elastomer (A1). A test piece was obtained using the resulting cross-linked rubber product by the above method, and original state properties (tensile strength, elongation, and hardness), water resistance, and deteriorated engine oil resistance were evaluated. Table 2 indicates results thereof.

Comparative Example 2

A cross-linked rubber product was obtained by a similar method to Example 1 except for using the acrylic elastomer (A9) in place of the acrylic elastomer (A1). A test piece was obtained using the resulting cross-linked rubber product by the above method, and original state properties (tensile strength, elongation, and hardness), water resistance, and deteriorated engine oil resistance were evaluated. Table 2 indicates results thereof.

Comparative Example 3

A cross-linked rubber product was obtained by a similar method to Example 1 except for using the acrylic elastomer (A10) in place of the acrylic elastomer (A1). A test piece was obtained using the resulting cross-linked rubber product by the above method, and original state properties (tensile strength, elongation, and hardness), water resistance, and deteriorated engine oil resistance were evaluated. Table 2 indicates results thereof.

Comparative Example 4

A cross-linked rubber product was obtained by a similar method to Example 1 except for using the acrylic elastomer (A11) in place of the acrylic elastomer (A1). A test piece was obtained using the resulting cross-linked rubber product by the above method, and original state properties (tensile strength, elongation, and hardness), water resistance, and deteriorated engine oil resistance were evaluated. Table 2 indicates results thereof.

Comparative Example 5

A cross-linked rubber product was obtained by a similar method to Example 1 except for using the acrylic elastomer (A12) in place of the acrylic elastomer (A1). A test piece was obtained using the resulting cross-linked rubber product by the above method, and original state properties (tensile strength, elongation, and hardness), water resistance, and deteriorated engine oil resistance were evaluated. Table 2 indicates results thereof.

Comparative Example 6

A cross-linked rubber product was obtained by a similar method to Example 1 except for using the acrylic elastomer (A13) in place of the acrylic elastomer (A1). A test piece was obtained using the resulting cross-linked rubber product by the above method, and original state properties (tensile strength, elongation, and hardness), water resistance, and deteriorated engine oil resistance were evaluated. Table 2 indicates results thereof.

Comparative Example 7

A cross-linked rubber product was obtained by a similar method to Example 1 except for using the acrylic elastomer (A14) in place of the acrylic elastomer (A1). A test piece was obtained using the resulting cross-linked rubber product by the above method, and original state properties (tensile strength, elongation, and hardness), water resistance, and deteriorated engine oil resistance were evaluated. Table 2 indicates results thereof.

Comparative Example 8

A cross-linked rubber product was obtained by a similar method to Example 1 except for using the acrylic elastomer (A15) in place of the acrylic elastomer (A1). A test piece was obtained using the resulting cross-linked rubber product by the above method, and original state properties (tensile strength, elongation, and hardness), water resistance, and deteriorated engine oil resistance were evaluated. Table 2 indicates results thereof.

Comparative Example 9

A cross-linked rubber product was obtained by a similar method to Example 1 except for using the acrylic elastomer (A16) in place of the acrylic elastomer (A1). A test piece was obtained using the resulting cross-linked rubber product by the above method, and original state properties (tensile strength, elongation, and hardness), water resistance, and deteriorated engine oil resistance were evaluated. Table 2 indicates results thereof.

TABLE 1

|  | Ex. 1 Acrylic elastomer (A1) | Ex. 2 Acrylic elastomer (A1) | Ex. 3 Acrylic elastomer (A2) | Ex. 4 Acrylic elastomer (A3) | Ex. 5 Acrylic elastomer (A4) | Ex. 6 Acrylic elastomer (A5) | Ex. 7 Acrylic elastomer (A6) | Ex. 8 Acrylic elastomer (A6) | Ex. 9 Acrylic elastomer (A7) |
|---|---|---|---|---|---|---|---|---|---|
| Composition of acrylic elastomer (% by weight) | | | | | | | | | |
| Methyl acrylate unit | — | — | — | — | — | — | 55 | 55 | — |
| Ethyl acrylate unit | 20 | 20 | — | — | — | — | — | — | — |
| n-Butyl acrylate unit | 78 | 78 | 78 | 68 | 68 | 98 | — | — | 78 |
| 2-Methoxyethyl acrylate unit | — | — | 20 | 20 | 25 | — | — | — | — |
| Methyl methacrylate unit | — | — | — | 10 | — | — | — | — | — |
| n-Butyl methacrylate unit | — | — | — | — | 5 | — | — | — | — |
| Acrylonitrile unit | | | | | | | | | |
| Ethylene unit | — | — | — | — | — | — | 37.5 | 37.5 | 5 |
| Vinyl acetate unit | — | — | — | — | — | — | — | — | 15 |
| Mono-n-butyl maleate unit | 2 | 2 | 2 | 2 | 2 | 2 | — | — | 2 |
| Acrylate acid unit | — | — | — | — | — | — | 7.5 | 7.5 | — |
| Acrylate elastomer composition blending (part) | | | | | | | | | |
| Acrylate elastomer (A1) | 100 | 100 | — | — | — | — | — | — | — |
| Acrylate elastomer (A2) | — | — | 100 | — | — | — | — | — | — |
| Acrylate elastomer (A3) | — | — | — | 100 | — | — | — | — | — |
| Acrylate elastomer (A4) | — | — | — | — | 100 | — | — | — | — |
| Acrylate elastomer (A5) | — | — | — | — | — | 100 | — | — | — |
| Acrylate elastomer (A6) | — | — | — | — | — | — | 100 | 100 | — |
| Acrylate elastomer (A7) | — | — | — | — | — | — | — | — | 100 |
| Acrylate elastomer (A8) | — | — | — | — | — | — | — | — | — |
| Acrylate elastomer (A9) | — | — | — | — | — | — | — | — | — |
| Acrylate elastomer (A10) | — | — | — | — | — | — | — | — | — |
| Acrylate elastomer (A11) | — | — | — | — | — | — | — | — | — |
| Acrylate elastomer (A12) | — | — | — | — | — | — | — | — | — |
| Acrylate elastomer (A13) | — | — | — | — | — | — | — | — | — |
| Acrylate elastomer (A14) | — | — | — | — | — | — | — | — | — |
| Acrylate elastomer (A15) | — | — | — | — | — | — | — | — | — |
| Acrylate elastomer (A16) | — | — | — | — | — | — | — | — | — |
| HAF carbon black (filler) | 60 | 60 | 60 | 60 | 60 | 60 | 60 | 60 | 60 |
| Stearic acid | 1 | 1 | 1 | 1 | 1 | 1 | 1 | 1 | 1 |
| Ester wax (lubricant) | 1 | 1 | 1 | 1 | 1 | 1 | 1 | 1 | 1 |
| 4,4'-Di-(α,α-dimethylbenzyl) diphenylamine (antioxidant) | 2 | 2 | 2 | 2 | 2 | 2 | 2 | 2 | 2 |
| Polyether ester plasticizer | — | 10 | — | — | — | — | — | 15 | — |
| Hexamethylenediamine carbamate (cross-linking agent) | 0.5 | 0.5 | 0.5 | 0.5 | 0.5 | 0.5 | 1.25 | 1.25 | 0.5 |
| 1,3-Di-o-totyl guanidine (cross-linking accelerator) | 2 | 2 | 2 | 2 | 2 | 2 | 4 | 4 | 2 |
| Molar fraction of element in acylic elastomer | | | | | | | | | |
| Molar fraction of oxygen atom (mol %) | 10.36 | 10.36 | 10.79 | 11.17 | 11.02 | 9.65 | 8.94 | 8.94 | 9.94 |
| Molar fraction of nitrogen atom (mol %) | 0 | 0 | 0 | 0 | 0 | 0 | 0 | 0 | 0 |
| Water resistance test (distilled water, 80° C. × 200 hr) | | | | | | | | | |
| Volume change ratio ΔV (%) | 3.5 | 2.8 | 4.6 | 4.2 | 4.6 | 3.6 | 2.9 | −0.2 | 4.0 |
| Normal physical properties | | | | | | | | | |
| Tensile strength (MPa) | 10.8 | 9.8 | 10.6 | 11.1 | 10.9 | 10.4 | 20.6 | 17.0 | 12.8 |
| Elongation (%) | 210 | 250 | 200 | 220 | 210 | 220 | 300 | 370 | 200 |
| Hardness (Duro A) | 70 | 63 | 69 | 73 | 71 | 67 | 82 | 74 | 74 |
| Determined engine oil dipping test (test liquid: engine oil, sulfuric acid 10,000 ppm, nitric acid 10,000 ppm, acetic acid 1,000 ppm, formic acid 1,000 ppm, 150° C. × 1,000 hr) | | | | | | | | | |
| Deteriorated engine oil resistance judgement | A | A | A | A | A | A | A | A | A |

TABLE 2

|  | Comp. Ex. 1 Acrylic elastomer (A8) | Comp. Ex. 2 Acrylic elastomer (A9) | Comp. Ex. 3 Acrylic elastomer (A10) | Comp. Ex. 4 Acrylic elastomer (A11) | Comp. Ex. 5 Acrylic elastomer (A12) | Comp. Ex. 6 Acrylic elastomer (A13) | Comp. Ex. 7 Acrylic elastomer (A14) | Comp. Ex. 8 Acrylic elastomer (A15) | Comp. Ex. 9 Acrylic elastomer (A16) |
|---|---|---|---|---|---|---|---|---|---|
| Composition of acrylic elastomer (% by weight) | | | | | | | | | |
| Methyl acrylate unit | — | 30 | — | — | — | — | — | — | — |
| Ethyl acrylate unit | — | — | 50 | 48 | 98 | — | — | — | 78 |
| n-Butyl acrylate unit | 66 | 68 | 48 | 25 | — | 78 | 90.5 | 81 | — |
| 2-Methoxyethyl acrylate unit | 30 | — | — | 70 | — | 20 | — | — | — |
| Methyl methacrylate unit | — | — | — | — | — | — | — | — | — |
| n-Butyl methacrylate unit | — | — | — | — | — | — | — | — | — |
| Acrylonitrile unit | — | — | — | — | — | — | 7.5 | 15 | — |
| Ethylene unit | — | — | — | — | — | — | — | — | 5 |
| Vinyl acetate unit | — | — | — | — | — | — | — | — | 15 |
| Mono-n-butyl maleate unit | 2 | 2 | 2 | 2 | 2 | 2 | 2 | 2 | 2 |
| Acrylate acid unit | — | — | — | — | — | — | — | — | — |
| Acrylate elastomer composition blending (part) | | | | | | | | | |
| Acrylate elastomer (A1) | — | — | — | — | — | — | — | — | — |
| Acrylate elastomer (A2) | — | — | — | — | — | — | — | — | — |
| Acrylate elastomer (A3) | — | — | — | — | — | — | — | — | — |
| Acrylate elastomer (A4) | — | — | — | — | — | — | — | — | — |
| Acrylate elastomer (A5) | — | — | — | — | — | — | — | — | — |
| Acrylate elastomer (A6) | — | — | — | — | — | — | — | — | — |
| Acrylate elastomer (A7) | — | — | — | — | — | — | — | — | — |
| Acrylate elastomer (A8) | 100 | — | — | — | — | — | — | — | — |
| Acrylate elastomer (A9) | — | 100 | — | — | — | — | — | — | — |
| Acrylate elastomer (A10) | — | — | 100 | — | — | — | — | — | — |
| Acrylate elastomer (A11) | — | — | — | 100 | — | — | — | — | — |
| Acrylate elastomer (A12) | — | — | — | — | 100 | — | — | — | — |
| Acrylate elastomer (A13) | — | — | — | — | — | 100 | — | — | — |
| Acrylate elastomer (A14) | — | — | — | — | — | — | 100 | — | — |
| Acrylate elastomer (A15) | — | — | — | — | — | — | — | 100 | — |
| Acrylate elastomer (A16) | — | — | — | — | — | — | — | — | 100 |
| HAF carbon black (filler) | 60 | 60 | 60 | 60 | 60 | 60 | 60 | 60 | 60 |
| Stearic acid | 1 | 1 | 1 | 1 | 1 | 1 | 1 | 1 | 1 |
| Ester wax (lubricant) | 1 | 1 | 1 | 1 | 1 | 1 | 1 | 1 | 1 |
| 4,4'-Di-(α,α-dimethylbenzyl) diphenylamine (antioxidant) | 2 | 2 | 2 | 2 | 2 | 2 | 2 | 2 | 2 |
| Polyether ester plasticizer | — | — | — | — | — | — | — | — | — |
| Hexamethylenediamine carbamate (cross-linking agent) | 0.5 | 0.5 | 0.5 | 0.5 | 0.5 | 0.5 | 0.5 | 0.5 | 0.5 |
| 1,3-Di-o-totyl guanidine (cross-linking accelerator) | 2 | 2 | 2 | 2 | 2 | 2 | 2 | 2 | 2 |
| Molar fraction of element in acylic elastomer | | | | | | | | | |
| Molar fraction of oxygen atom (mol %) | 11.39 | 11.57 | 11.48 | 12.57 | 13.40 | 10.79 | 9.06 | 8.46 | 12.91 |
| Molar fraction of nitrogen atom (mol %) | 0 | 0 | 0 | 0 | 0 | 0 | 0.88 | 1.78 | 0 |
| Water resistance test (distilled water, 80° C. × 200 hr) | | | | | | | | | |
| Volume change ratio ΔV (%) | 4.8 | 5.3 | 3.8 | 4.2 | 6.1 | 6.5 | 3.6 | 4.1 | 4.4 |
| Normal physical properties | | | | | | | | | |
| Tensile strength (MPa) | 10.8 | 13.4 | 12.1 | 11.8 | 14.7 | 10.5 | 13.8 | 16.4 | 13.5 |
| Elongation (%) | 200 | 290 | 210 | 210 | 370 | 190 | 310 | 360 | 210 |
| Hardness (Duro A) | 71 | 72 | 75 | 74 | 75 | 69 | 71 | 85 | 76 |
| Determined engine oil dipping test (test liquid: engine oil, sulfuric acid 10,000 ppm, nitric acid 10,000 ppm, acetic acid 1,000 ppm, formic acid 1,000 ppm, 150° C. × 1,000 hr) | | | | | | | | | |
| Deteriorated engine oil resistance judgement | B | C | C | C | C | B | C | C | C |

As Table 1 indicates, a cross-linked rubber product obtained by cross-linking an acrylic elastomer composition containing an acrylic elastomer obtained by copolymerization of an acrylate and a cross-linking site monomer, in which the molar fraction of an oxygen atom in the acrylic elastomer is 11.3 mol % or less, the molar fraction of a nitrogen atom in the acrylic elastomer is 0.5 mol % or less, and a volume change is from −3 to 6% when the cross-linked rubber product is dipped in distilled water at 80° C. for 200 hours, has excellent deteriorated engine oil resistance (Examples 1 to 9).

On the contrary, as Table 2 indicates, a cross-linked rubber product in which the molar fraction of an oxygen atom in the acrylic elastomer is more than 11.3 mol % has poor deteriorated engine oil resistance (Comparative Examples 1 to 5 and 9). A cross-linked rubber product in which the molar fraction of a nitrogen atom in the acrylic elastomer is more than 0.5 mol % has poor deteriorated engine oil resistance (Comparative Examples 7 and 8). A cross-linked rubber product in which the molar fraction of an oxygen atom in the acrylic elastomer is 11.3 mol % or less, the molar fraction of a nitrogen atom in the acrylic elastomer is 0.5 mol % or less, but a volume change is not within a range of −3 to 6% when the cross-linked rubber product is dipped in distilled water at 80° C. for 200 hours, has poor deteriorated engine oil resistance (Comparative Example 6).

The invention claimed is:

1. A cross-linked rubber product obtained by cross-linking an acrylic elastomer composition containing an acrylic elastomer obtained by copolymerization of an acrylate and a cross-linking site monomer having a carboxyl group, wherein a molar fraction of an oxygen atom (a) in the acrylic elastomer is 11.3 mol % or less, a molar fraction of a nitrogen atom (b) in the acrylic elastomer is 0.5 mol % or less, a content of n-butyl acrylate unit in a monomer unit constituting the acrylic elastomer is from 78 to 99.9% by weight, and a volume change is from -3 to 6% when the cross-linked rubber product punched into a size of a length of 30 mm, a width of 20 mm, and a thickness of 2.0±0.2 mm is dipped in distilled water at 80° C. for 200 hours.

2. The cross-linked rubber product according to claim 1, wherein the acrylate is n-butyl acrylate, or n-butyl acrylate and at least one selected from a group consisting of methyl acrylate, ethyl acrylate, and 2-methoxyethyl acrylate.

3. The cross-linked rubber product according to claim 1, wherein the acrylic elastomer contains 0.1 to 10% by weight of a cross-linking site monomer unit.

\* \* \* \* \*